United States Patent Office 3,429,339
Patented Feb. 25, 1969

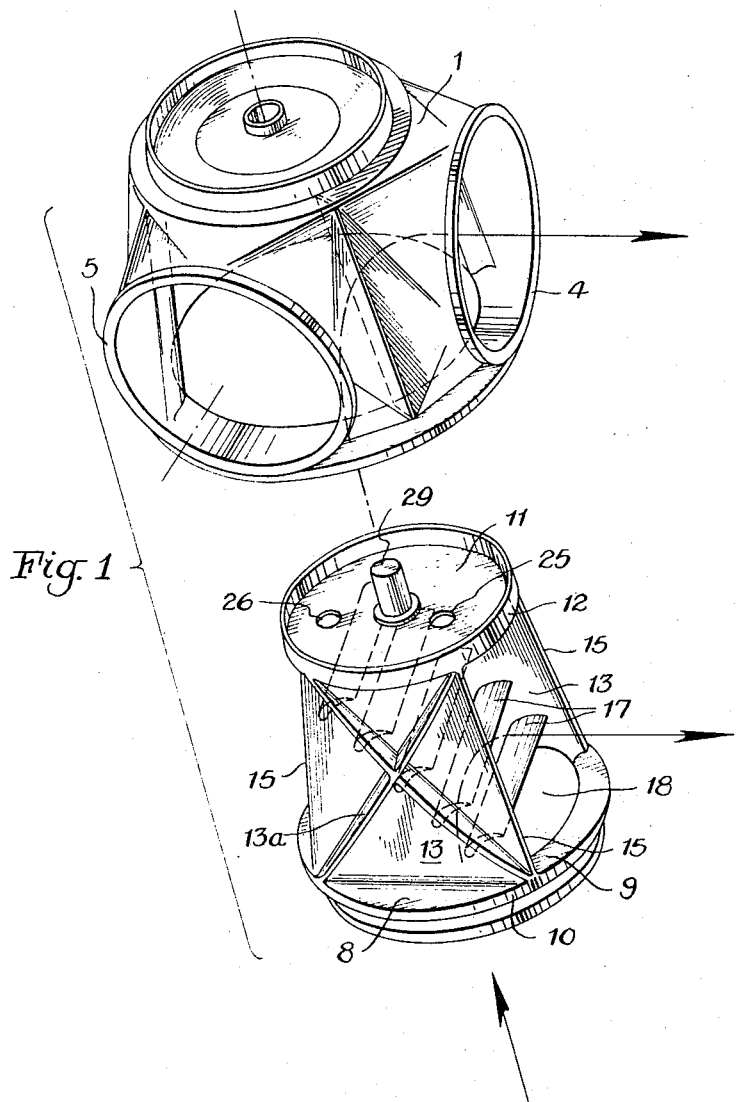

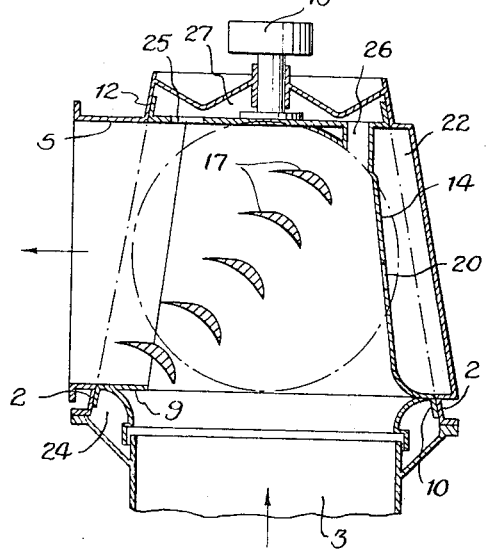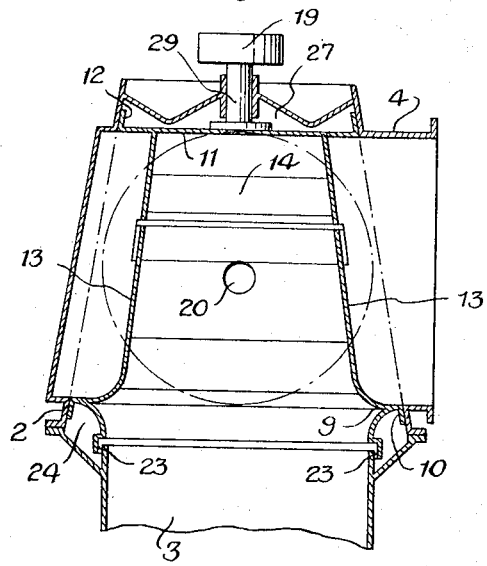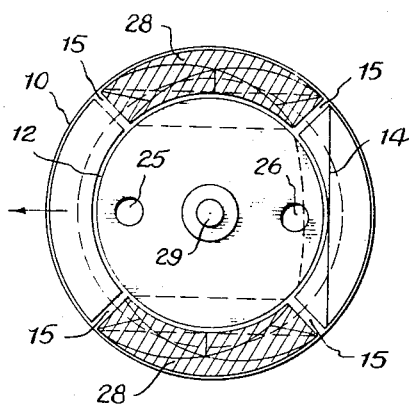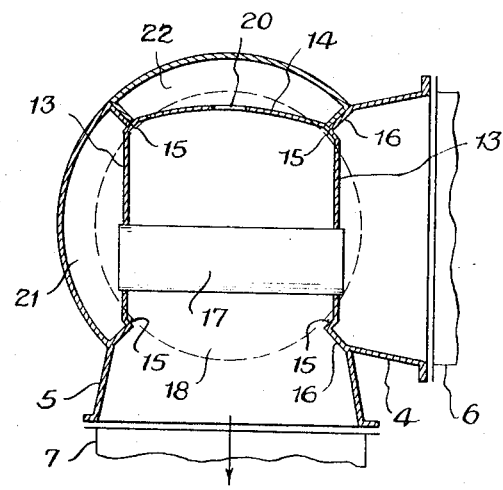

3,429,339
ROTARY SLIDE VALVE FOR BRANCHED PIPE LINES
Heinrich Teichmann, Geiselbullach, Germany, assignor to M.A.N. Turbo GmbH, Munich-Allach, Germany
Filed June 20, 1966, Ser. No. 558,876
Claims priority, application Germany, June 24, 1965, B 82,542
U.S. Cl. 137—625.47
Int. Cl. F16k *11/02, 39/06*
8 Claims

ABSTRACT OF THE DISCLOSURE

An exhaust gas deflecting device for a gas turbine engine has a rotary slide valve rotatably mounted in a valve housing having branched outlet openings. Pressure equalizing chambers are between the slide valve and the housing for preventing the slide valve from tilting and jamming during the flow of hot turbine engine exhaust gases through the device.

---

This invention relates to a rotary slide valve for branched pipe lines through which gas, such as hot exhaust waste gas from a turbine, is adapted to flow.

Branched pipe lines joined by a rotary slide valve are used for the control and recycling of the hot turbine exhaust gases used to power aircraft. Because of the high temperatures of these waste gases and the high pressures, the rotary slide valve which is usually constructed of a light metal is liable to become warped and have its sealing surfaces jammed so that it does not function satisfactorily.

The object of this invention is to produce a rotary slide valve which does not have the above disadvantage. In this invention, the rotary slide valve body is mounted in a housing which has the branched pipe outlets and with pressure equalizing chambers between the valve body and the housing located both in the direction of the longitudinal axis of the valve body and transversely of the axis and which chambers are in communication with the hot waste gases and/or the atmosphere. Hydraulic or mechanical means are used to move the valve body in the direction of its longitudinal axis and also to turn the valve body.

This invention, therefore, has the advantage that the gas pressures transversely of the longitudinal axis of the valve body are equalized so that no forces arise which are diagonal of the longitudinal axis and which would produce a tilting momentum which would, in turn, cause the valve body to jam in the housing.

On the other hand, the gas pressures extending transversely of the longitudinal axis are only partially equalized in order to make sure that the sealing surfaces are tight. Consequently, because of the more or less complete equalization of the gas pressures on the valve body, the valve can be constructed of light metal and little force is required to actuate the body especially in separating the sealing surfaces.

The principal advantage of this invention is in that, because the sealing surfaces are separated before the valve body is rotated, the valve can be operated without jamming even though either the valve housing or body becomes warped.

Figure 6:
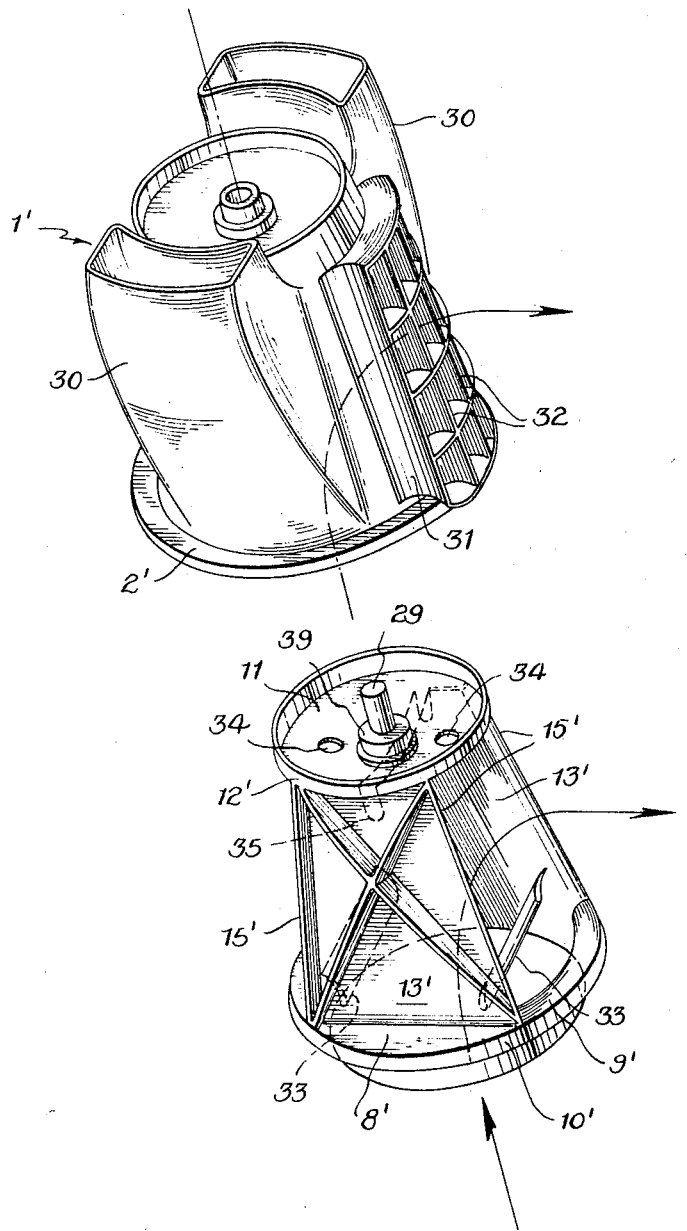
Figure 7:
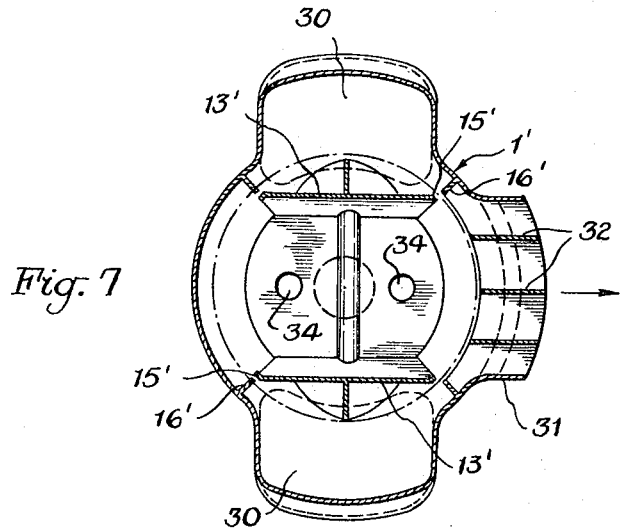
Figure 8:
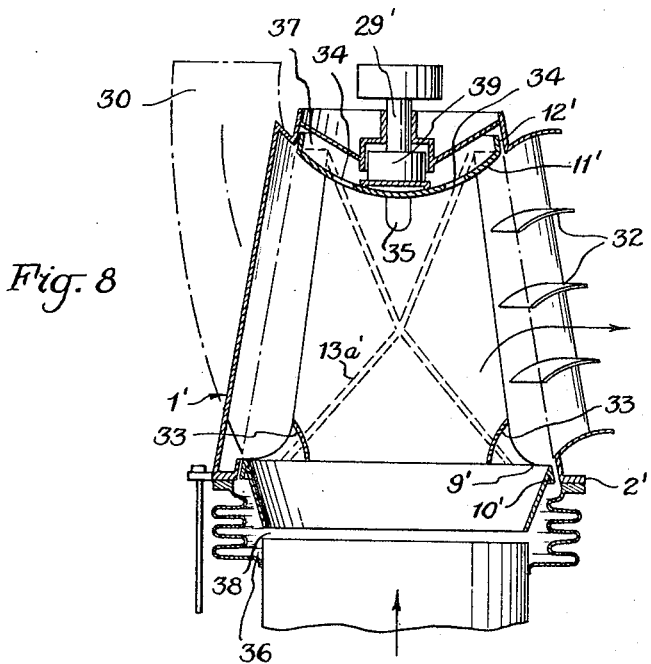

The means by which the objects of the invention are obtained are described more fully with reference to the accompanying drawings in which:

FIGURE 1 is a perspective view of the valve with the valve body separated from the valve housing;
FIGURE 2 is a cross-sectional view through the valve;
FIGURE 3 is a side view of FIGURE 2;
FIGURE 4 is a cross-sectional view taken through FIGURE 3;
FIGURE 5 is a top view of FIGURE 2;
FIGURE 6 is a view similar to FIGURE 1 of a modified form of the invention;
FIGURE 7 is a cross-sectional view of the valve of FIGURE 6; and
FIGURE 8 is a vertical cross-sectional view through the valve of FIGURE 6.

As shown in FIGURES 1 to 5, the valve housing 1 has a pipe connecting piece 2 for the gas supply line 3. The valve housing also has the two pipe connecting pieces 4 and 5 which are separated by 90° and lie at right angles to the intake flow of the gas through line 3. These pieces 4 and 5 are connected to the branched pipes 6 and 7, note FIGURE 4. Mounted within the housing is a rotary slide valve body 8 which is substantially conical and is used to direct the incoming gas into either of the two branch pipes 6 and 7 or into both at the same time. The valve is adapted to be rotated about its longitudinal axis.

The valve body 8 has a circular bottom 9 whose circumferential edge 10 is conical and functions as a first valve head which is adapted to seat on the connecting piece 2. The valve body has the circular top 11 having a conical circumferential edge 12 which functions as a second valve head and is adapted to seat on the top wall of housing 1. Two flat side walls 13 extend between the bottom 9 and top 11 and are inclined in the form of a cone. These walls are reinforced by ribs 13a. Walls 13 are joined by a back wall 14. The connecting edges 15 between the walls 13 and 14 also function as a valve head and in the direction of the longitudinal axis of the body and are adapted to be seated on valve seat edges 16 mounted within the housing 1. Hollow guide vanes 17 extend between the side walls 13 and direct the outward flow 18 of the gas through the valve.

Hydraulic or mechanical means are connectable to a knob 19 secured to the top surface 11 of the valve body by a journal pin 29 for both lifting or lowering the valve in the direction of the longitudinal axis of the valve body and for turning the valve body around said axis.

In order to ensure a satisfactory functioning of the valve, even under severe conditions of high pressures and temperatures, the gas pressures on the valve body are equalized transversely of the longitudinal axis of the valve body by reason of the hollow guide vanes 17 which extend through walls 13 and a port 20 located in the back wall 14. Thus stabilizing chambers 21 and 22 extend around the valve body. As shown in FIGURE 4, for example, when the branch pipe 7 receives the hot waste gas, the branch pipe 6 conducts atmospheric pressure through the hollow vanes 17 into equalizing chamber 21 so that both side walls 13 are subject to the same pressure. Opposite branch pipe 7 in this case is the equalizing chamber 22 which is under the gas pressure by reason of the port 20. Consequently, the valve body 8 is under equal forces transversely of the longitudinal axis of the body.

In the direction of its longitudinal axis, valve body 8 is in communication with an equalizing chamber 24, note FIGURES 2 and 3, by way of an angular slot 23 and is open to the intake gas. At the top, the valve body has ports 25 and 26 which give communication with the pressure equalizing chamber 27. According to this invention, it is possible to influence pressure equalization in the direction of the axis of the body for influencing the sealing surfaces and/or tightening forces between the valve edges 15 and the edges 16 as dependent upon the inclination of the conical surface of the valve body as formed by the side walls 13 and/or its projected surface 28 as shown in the hatched area in FIGURE 5. Thus the pressure equalization in the direction of the valve body axis is such that the tightening of the sealing surfaces is always guaranteed. The amount of the pressure equalization in the direction of the valve body axis can be changed by the selection of the diameter for the journal pin 29 of the valve body 8 in the valve housing 1.

In the modification of FIGURES 6, 7 and 8, the valve housing 1' has a pipe connecting piece 2' for the intake of the waste gas from the turbine as well as to outlet pipe connecting pieces 30 which are separated by 180° and which extend at an acute angle to the longitudinal axis of the valve housing. Between the pieces 30 is another outlet pipe connection 31 which has exhaust guide vanes 32 to deflect the flow of gas at an angle of about 90°.

The rotary slide valve body 8' is again essentially composed of a circular bottom 9' having a conical circumference 10' which forms a valve head adapted to seat on the connecting pipe 2'. It also has a circular top 11' with a conical circumferential edge 12' which functions as a second valve head adapted to seat on the upper portion of the valve housing 1'. Two side walls 13 extend between the bottom 9' and top 11' and which are flat and inclined to form a conical body. They are provided with reinforcing ribs 13'a and have longitudinal edges 15' which act as valve heads for seating on the edges 16' mounted within valve housing 1'. Two curved guide plates 33 extend between the side walls 13' and are pointed in opposite directions to cause a small deflection of the intake gas.

Hydraulic or mechanical means are again provided for actuating the valve body 8' and are joined to the journal pin 29' mounted on the top surface 11' for lifting or lowering the valve body for the valve seats and then rotating the valve body so that it can discharge gas either through the connecting piece 30 or piece 31. The pressure equalization both in the direction of the longitudinal axis of the valve body and transversely thereto is obtained by means of ports 34 and/or an air duct 35 which communicate with the pressure equalizing chambers 36 and 37 which communicate with the intake gas by way of an annular slot 38 and/or the ports 34. The tightened pressure on the valve seats in the direction of the longitudinal axis is again dependent upon the relationship of the surfaces of the chambers 36 and 37 which can be adjusted by changing the diameter of the collar 39 on the top 11'.

Having now described the means by which the objects of the invention are obtained.

I claim:

1. An exhaust gas valve for a gas turbine engine comprising a valve housing having branched outlet openings, a rotary slide valve body mounted in said housing and rotatable about its longitudinal axis, pressure equalizing chamber means between said body and said housing for communication with the exhaust gas pressure in said body or with the atmosphere, a waste gas intake pipe piece on the waste gas intake side of said housing, a waste gas outlet pipe connecting piece on each of two waste gas outlet sides of said housing, respectively, said valve body having a circular bottom with a conical circumference forming a first valve head adapted to bear on said waste gas intake connecting piece, a circular top on said valve body having a conical circumference forming a second valve head adapted to bear on the top of said housing, two inclined flat side walls and a back wall joined to and extending between said body top and body bottom, housing valve seat edges in said housing adapted to form valve seats for the joined edges between each side wall and said back wall, respectively, in the direction of said axis, and gas guide vanes mounted between said side walls.

2. A valve as in claim 1, further comprising journal pin means mounted on the top of said valve body for lifting and turning said valve body.

3. A valve as in claim 2, said vanes being hollow for the passage of equalizing pressures through said side walls into the chamber means lying transversely of said axis, and a port in said valve body back wall for the passage of equalizing pressure therethrough.

4. A valve as in claim 3, said pressure equalizing chamber means further comprising a chamber between the bottom of said valve body and said housing, a chamber between the top of said valve body and said housing, and ports in the circular top of said body for the passage of equalizing pressures in the direction of said axis.

5. A valve as in claim 1, further comprising a waste gas intake connecting piece on the waste gas intake side of said housing, waste gas outlet pipe connecting pieces on opposite sides of said housing extending at an acute angle to said axis, and a gas directing vane containing pipe connecting piece on the side of said housing between said waste gas outlet connecting pieces for deflecting intake gas through an angle of about 90°.

6. A valve as in claim 5, said valve body having a circular bottom with a conical circumference forming a first valve head adapted to bear on said waste gas intake connecting piece, a circular top on said valve body having a conical circumference forming a second valve head adapted to bear on the top of said housing, two inclined flat walls extending between said body top and said body bottom, housing valve seat edges in said housing adapted to form valve seats for the side edges of said walls in the direction of said axis, and curved guide plates extending between said walls for partially deflecting the flow of gas through said body in opposite directions.

7. A valve as in claim 6, further comprising port means in said circular top and slot means between said valve body bottom and housing for the passage of equalizing pressures in the direction of said axis into said chamber means between said valve body and said housing.

8. A valve as in claim 7, further comprising collar means on the top of said body for adjusting the valve head pressure in the direction of said axis dependent upon the surface area ratios of said chamber means.

References Cited

UNITED STATES PATENTS 2,707,613   5/1955   Wheatley _____ 251—283

FOREIGN PATENTS 654,135   12/1937   Germany.

M. CARY NELSON, *Primary Examiner.*
JOHN D. DWELLE, *Assistant Examiner.*

U.S. Cl. X.R.

251—283